United States Patent [19]

Giglio et al.

[11] 4,239,245
[45] Dec. 16, 1980

[54] PACKING SEALS AND METHOD OF MAKING

[75] Inventors: Richard J. Giglio, Tewksbury; Robert B. Bogosh, Burlington, both of Mass.; David A. Lasnier, Londonderry, N.H.

[73] Assignee: A. W. Chesterton Company, Stoneham, Mass.

[21] Appl. No.: 101,635

[22] Filed: Dec. 7, 1979

[51] Int. Cl.³ .................. F16J 15/44; F16J 15/54; B29C 17/02
[52] U.S. Cl. .................. 277/203; 264/157; 264/235; 264/295; 264/339; 264/DIG. 40; 277/204
[58] Field of Search .......... 277/124, 203, 204; 29/156.6; 264/157, 230, 295, 339, DIG. 40, 294, 236, 235

[56] References Cited

U.S. PATENT DOCUMENTS

| | | |
|---|---|---|
| 567,233 | 9/1896 | Gruber . |
| 646,413 | 4/1900 | Collet .................. 264/DIG. 40 |
| 1,998,892 | 4/1935 | Braden .................. 277/235 |
| 2,323,286 | 6/1943 | Ward .................. 264/DIG. 40 |
| 2,776,154 | 1/1957 | Leistensnider . |
| 3,207,827 | 9/1965 | Kuehule .................. 264/295 |
| 4,157,833 | 6/1979 | Kozlowski .................. 277/124 |

Primary Examiner—James B. Lowe

[57] ABSTRACT

A method of making a packing seal comprising compression molding a thermo-setting plastic in a spiral mold so that a partially-cured spiral seal is formed, removing the partially-cured seal from the mold, and winding it on a mandrel of a selected diameter, curing the spiral seal on the mandrel, and removing the seal from the mandrel, whereby the resulting seal is resilient and can be used to seal any part having a diameter within a given range, which range has the diameter of the mandrel as a median.

9 Claims, 5 Drawing Figures

PACKING SEALS AND METHOD OF MAKING

FIELD OF THE INVENTION

This invention pertains to a method of making a packing seal.

BACKGROUND OF THE INVENTION

Packing seals are well-known and used to prevent leakage around various movable machine parts, such as those in hydraulic pumps and the like.

The basic prior art packing seal is comprised of a series of individual rings which fit on top of one another when they are in place around the part to be sealed. Other prior art seals are of the spiral type, such as those shown in Gruber U.S. Pat. No. 567,233. These spiral seals are made of one continuous coiled piece and compress to seal the machine parts. In both cases, the inner diameter of the seal must be close to the outer diameter of the shaft or other machine part to be sealed in order to assure a tight fit and prevent leakage therebetween. Accordingly, the principal drawback of the prior art seals is that they are expensive to manufacture because different seal molds have to be made for seals of even slightly different diameter.

In an effort to overcome this drawback, some individual ring seals, i.e., the 8000 series from the A. W. Chesterton Company, the assignee herein, can be cut down so as to fit around parts having diameters somewhat smaller than that of the original ring. However, the cut away portion of the ring is wasted, and in any event, the ring cannot be made to fit parts having even a slightly greater diameter than that of the original ring.

SUMMARY OF THE INVENTION

It is a principal object of this invention to provide an inexpensive method of fabricating a spiral packing seal which can be used to seal parts having diameters larger or smaller than that of the original seal.

In general, the invention features compression molding a thermo-setting plastic in a spiral mold under heat so that a partially-cured spiral seal is formed, removing the partially-cured seal from the mold and winding it on a mandrel, applying heat thereto so that the spiral seal is cured, and removing the seal from the mandrel.

In preferred embodiments, a heated, homogenous thermosetting liquid urethane elastomer is poured into the female portion of a spiral mold. The male portion of the mold is compressed into the female mold, and heat is applied so that the liquid plastic turns into a plastic gum-like substance. This partially-cured spiral seal is then wrapped around a cylindrical mandrel of a selected diameter and further cured by heating. Once removed from the mandrel, the seal is placed in an oven for final curing. When cured, the seal is resilient and can be wrapped around and effectively seal machine parts of diameters. This is done by cutting the spiral at selected points so that a series of identical rings are obtained, the rings having the diameter of the part to be sealed. Adaptors are similarly cut and placed on the top and bottom of the stack of rings, which stack is then slipped around the machine part. The seal is a good one because the hardened elastomer resists wear and extrusion and is not absorbent. If more rings are needed, a longer spiral seal can be made by using a splicing machine to bond one end of a spiral seal to an end of another seal.

DESCRIPTION OF THE DRAWINGS

Other objects, features and advantages of the invention will be apparent to those skilled in the art from the following detailed description of a preferred embodiment taken together with the accompanying drawings, in which.

DETAILED DESCRIPTION

Figure 1:
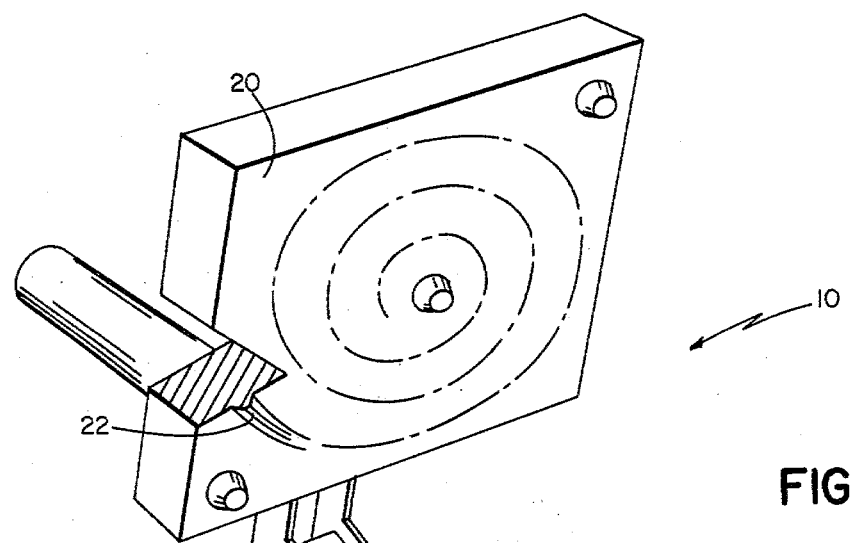
FIG. 1 is a perspective view of a compression mold, with portions cut away, of this invention.
Figure 1:
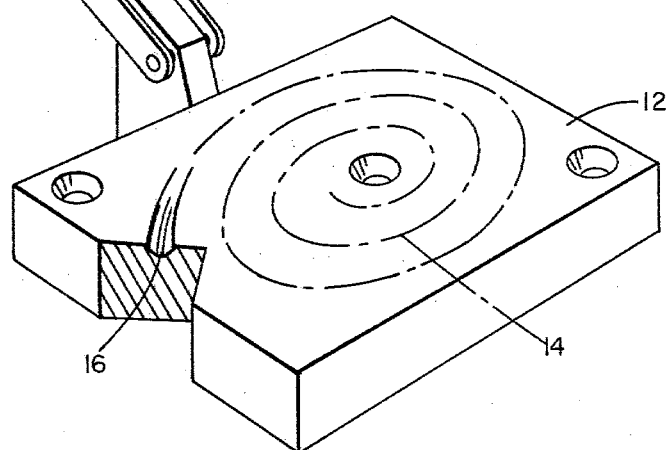

Referring to FIG. 1, a mold 10 is shown which comprises a female lower portion 12 and a male top portion 20. The female portion 12 has a spiral groove 14 with a V-shaped ridge 16 in its bottom. The male top portion 20 has a rounded spiral 22 protruding from its surface. The spiral 22 fits into the groove 14 when the male portion 20 of the mold 10 is in place.

A liquid thermo-setting plastic, urethane elastomer, is made by mixing a liquid resin such as L167 from DuPont with a catalyst such as 4,4-methylene-bis(2-chloroaniline) available from the Polyester Corporation of New York. The catalyst is in pellet form, and it is melted prior to mixing with the liquid resin. The resulting liquid plastic is then heated to between 180°-220° F. and poured into the spiral groove 14 of the mold 10. The groove 14 is not completely filled with the liquid plastic.

At this point, the top portion 20 of the mold 10 is closed over the bottom portion 12 so that the rounded spiral 22 pushes into the liquid plastic in the groove 14. The portions of the mold are then pressed together by hydraulic presses (not shown). The presses exert a pressure of 1000 psi for the smaller molds, but less pressure may be used. At the same time, the mold is subjected to between 180° and 220° F. The compression molding is continued for between 4 and 6 minutes.

The mold is then opened and the heat shut off. The compression molding has partially cured the liquid plastic into a solid plastic gum stage. The resulting spiral seal is resilient but has not been cured enough to have a memory.

Figure 2:
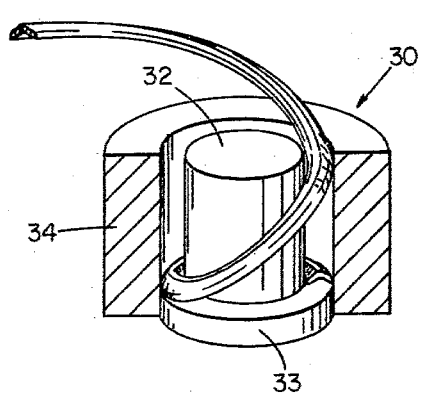
FIG. 2 is a partial cross-sectional view of the mandrel.

A mandrel 30, as shown in FIG. 2, is then chosen. The mandrel 30 has an inner cylinder 32 with a lower lip 33, and concentric outer cylinder 34. The cylinders are not attached, and their walls are separated by a distance approximately equal to the cross-sectional thickness of the spiral seal. The partially-cured seal from the mold is then fed into the space between the cylinders 32, 34 so that the spiral seal is wrapped around the cylinder 32 from the lip 33 to the opposite end of the cylinder 32. The outer cylinder 34 prevents the spiral seal from unravelling. The mandrel 30 with the spiral seal wrapped thereon is then heated in an oven at 180°-220° for between 15 and 30 minutes. This cures the seal so that it has dimensional integrity and stability as well as resilient memory. The inner diameter of the seal is that of the inner cylinder of the selected mandrel. There are four available inner cylinders for the preferred embodiment, and they have diameters of 3.25, 4.25, 7.25, and 11.25 inches. Four different molds are used with the four different mandrels. The molds only vary in size so that a longer spiral seal is produced for use with the larger mandrels.

Figure 3:
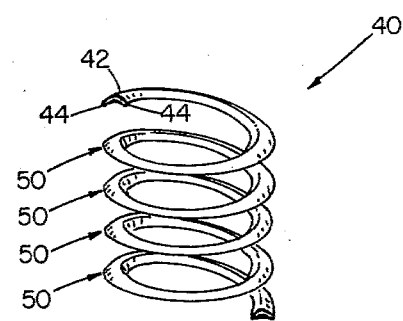
FIG. 3 is a perspective view of a spiral seal.

A cured spiral seal 40 is shown in FIG. 3. It has a domed top 42, formed by the V-shaped ridge 16 in the bottom of the mold 10. The seal 40 also has a pair of downwardly extending peripheral ridges 44, formed when the rounded spiral 22 of the male portion 20 of the mold 10 was pressed into the liquid plastic in the spiral groove 14 of the mold 10. When the spiral seal 40 is compressed, successive coils 50 fit together as the domed top 42 of one coil fits between the ridges 44 of the coil above.

As a final step, the spiral seal 40 is tied in its compressed position and placed in an oven at 180°–220° F. for 2 to 3 hours for a final curing. The spiral seal is resilient, and the hardened elastomer resists wear and extrusion and is non-absorbent.

Figure 4:
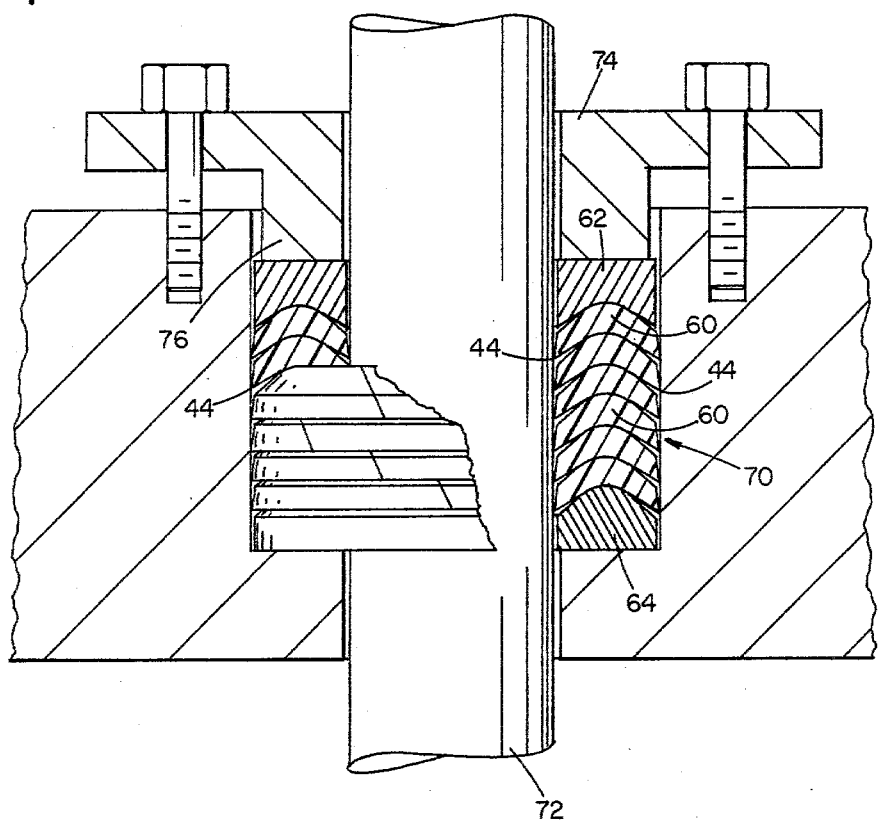
FIG. 4 is a cross-sectional view of a compressed seal in place around a machine part.

The spiral seal is marked with measurement dimples such as those shown in Kozlowski, U.S. Pat. No. 4,157,833, owned by the assignee and incorporated herein by reference. The markings permit a purchaser to cut the spiral seal into a series of individual rings 60 having the same diameter of the part to be sealed without the need for difficult measurement or waste. The rings are then center stacked as shown in FIG. 4. A top adaptor 62 and a bottom adaptor 64 are then added to the stack. The adaptors 62, 64 are made in the same manner as the spiral seal except the mold has a different shape. The resulting spiral adaptors are then cut into two rings which are placed above and below the stack of rings 60 as shown. The entire seal 70 is then placed around a shaft 72 or other machine part, and a gland 74 having a protruding collar 76 is tightened over the seal 70. The collar presses the seal 70 together, and the ridges 44 flare outwardly so that they press against the shaft 72, thereby sealing it.

Because of the resiliency of the spiral seal, the individual rings 60 can be cut to fit a machine part having a diameter approximately 20% larger or smaller than the diameter of the inner cylinder of the selected mandrel on which the spiral seal was cured. Therefore, with just the four inner cylinder sizes, seal rings can be made for parts within a range of diameters for 2.75 inches to 13.75 inches, and as the rings are cut from successive portions of the spiral seal, there is little wasted seal.

Figure 5:
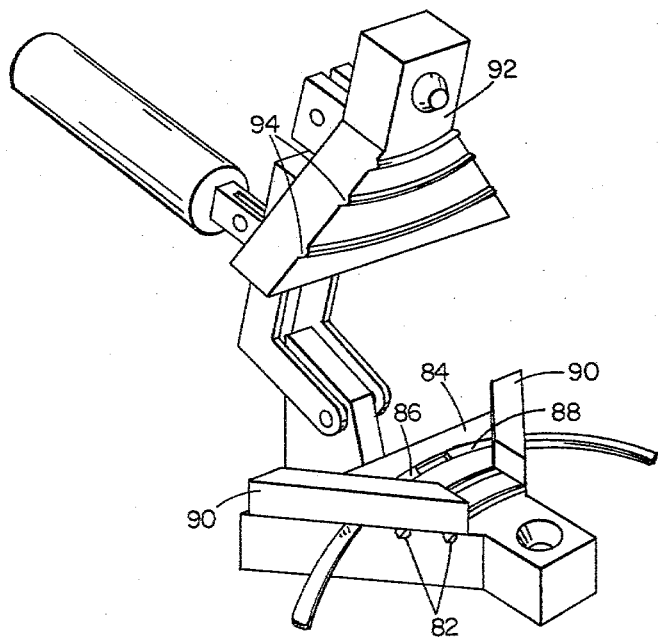
FIG. 5 is a perspective view of a splicer machine.

The length of the seal can be increased by connecting together two or more spiral seals by use of the splicer 80 of FIG. 5. Splicer 80 is essentially a pie-shaped portion of the mold 10. Splicer 80 has a series of grooves 82 (three shown) in a female portion 84, and the diameter of the grooves 82 correspond to the diameter of the spiral seals from the different mandrels. One end 86 of a spiral seal slides into the selected groove 82 from one side and an end 88 of another seal slides into the groove from the opposite direction. Clamps 90 hold the ends 86, 88 in place. Heated thermo-setting plastic is poured between and over the ends 84, 86, and a male portion 92 having a series protruding rounded spirals 94 is closed. Compression molding is applied to this interface at 180°–220° F. for 5 to 10 minutes. At the end of that time, there is a solid joint connecting the two seals, and the joined seals are then placed into a curing oven for several hours.

OTHER EMBODIMENTS

Other thermo-setting materials, and different resins, and catalysts may be used with this invention. The mold may be made in different shapes, and the width of the seal may be varied. Also, much less pressure than 1000 psi may be used in compression molding. It should also be understood that the inner cylinder of the mandrel may be of any desired diameter, and the four selected mandrel diameters are not critical. It is also possible to use the spiral seal without cutting it into individual rings. However, this may not be possible in some cases where there is limited accessibility to the machine part to be sealed.

Other variations will be apparent to those skilled in the art.

What is claimed is:

1. A method of making a packing seal comprising:
   compression molding a thermo-setting plastic in a spiral mold under heat so as to form a partially-cured spiral seal,
   removing said partially-cured spiral seal from said mold and winding it on a mandrel,
   applying heat to said mandrel and partially-cured seal so as to cure said seal, and
   removing said seal from said mandrel.

2. The method of claim 1 further comprising
   heating said seal in a post-curing oven after said seal is removed from said mandrel.

3. The method of claim 2 wherein said heating in a post-curing oven is for 2 to 3 hours at 180°–220° F.

4. The method of claim 1 wherein said plastic is urethane elastomer.

5. The method of claim 1 wherein said compression molding comprises pouring a heated, liquid plastic into a female portion of said spiral mold, covering said female portion with a male portion of said spiral mold and applying pressure thereto for a period of approximately five minutes at 180°–220° F.

6. The method of claim 5 wherein the pressure is 1000 psi.

7. The method of claim 2 wherein said applying heat to said mandrel and partially-cured seal includes placing said mandrel and said seal in an oven at 180°–220° F. for between 15 and 30 minutes.

8. The method of claim 1 wherein said spiral seal is cut into a series of individual ring seals after it is removed from said mandrel.

9. A packing seal made in accordance with the method of claims 1 or 2.

* * * * *